United States Patent

[11] 3,626,040

| [72] | Inventors | Kazuyoshi Nagao;<br>Akihiko Katsura, both of Yokohama, Japan |
|---|---|---|
| [21] | Appl. No. | 863,962 |
| [22] | Filed | Oct. 6, 1969 |
| [45] | Patented | Dec. 7, 1971 |
| [73] | Assignee | American Optical Corporation<br>Southbridge, Mass. |

[54] METHOD OF MAKING FUSED BUNDLES OF LIGHT-CONDUCTING FIBERS
3 Claims, 6 Drawing Figs.

[52] U.S. Cl. ............................................. 264/1,
65/4, 65/DIG. 7
[51] Int. Cl. ....................................... B29d 11/00
[50] Field of Search ............................. 264/1, 332;
65/4, DIG. 7; 18/16.5

[56] References Cited
UNITED STATES PATENTS

| 3,150,412 | 9/1964 | Newhall | 18/16.5 |
| 3,150,413 | 9/1964 | Zeithin et al. | 18/16.5 |
| 3,224,851 | 12/1965 | Hicks, Jr. | 65/DIG. 7 |
| 3,226,589 | 12/1965 | Woodcock | 65/DIG. 7 |
| 3,275,428 | 9/1966 | Siegmund | 65/DIG. 7 |
| 3,279,902 | 4/1968 | Gardner | 65/DIG. 7 |

*Primary Examiner*—Robert F. White
*Assistant Examiner*—Allen M. Sokal
*Attorney*—William C. Nealon ABSTRACT: Forming a vacuum-tight fused bundle of light-conducting fibers in a compression mold. An elongated mold having a cross cavity with a plunger closing each of the four sides thereof is filled with light-conducting fibers extending along the length of the cavity in side-by-side parallel relationship with each other. The fibers are heated to fusing temperature and the plungers are all simultaneously forced against the fibers toward a central axis through the cavity under uniform high pressure whereby a substantially uniform pattern of individual fiber distortion is produced throughout the resulting fused bundle of fibers.

PATENTED DEC 7 1971  3,626,040
FIG.1. (PRIOR ART)
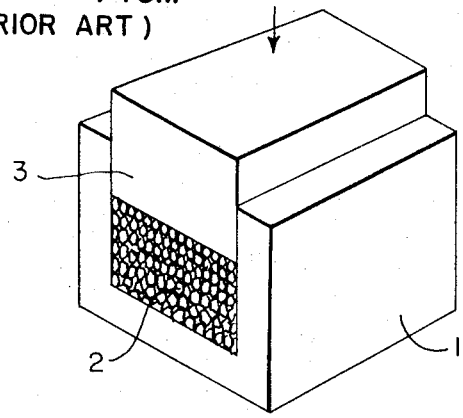
FIG.2. (PRIOR ART)   FIG.2a. (PRIOR ART)   FIG.2b. (PRIOR ART)
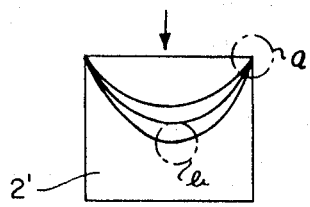      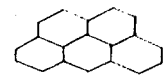
FIG.3.
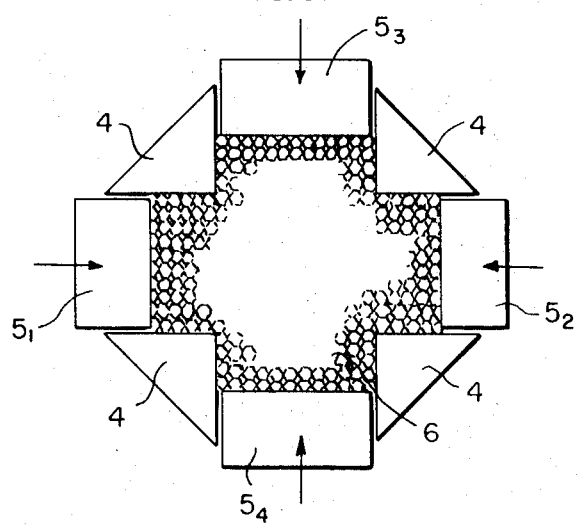
FIG.4.
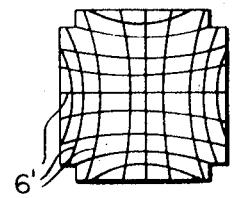
INVENTORS
KAZUYOSHI NAGAO
AKIHIKO KATSURA
BY Noble Williams
ATTORNEY

3,626,040

METHOD OF MAKING FUSED BUNDLES OF LIGHT-CONDUCTING FIBERS

BACKGROUND OF THE INVENTION

1. Field Of The Invention

Fiber optics with particular reference to the manufacture of fused vacuum-tight bundles of optical fibers.

2. Description Of The Prior Art

Fused bundles of optical fibers and/or section cut therefrom which are intended for use as face plates in vacuum tubes and the like are required to be gas-tight under vacuum and, at the same time, preferably be uniformly transmissive to light from edge-to-edge.

Heretofore, however, the practice of vacuum sealing a bundle of optical fibers in a rectangular compression mold has distorted the cross-sectional shape of the bundle as a whole causing individual fibers thereof to assume different cross-sectional shapes throughout the bundle. This adversely affects the light transmission properties of the bundle and/or of devices formed from parts of the bundle rendering the bundle or its parts inferior in resolving optical image information.

The present invention deals with an improved method of compression-sealing bundles of optical fibers wherein nonuniform distortions of the bundle fibers are avoided.

SUMMARY OF THE INVENTION

A vacuum-tight fused bundle of light-conducting fibers is formed by filling an elongated mold cavity having the configuration of a cross with long and thin juxtaposed fibers. With the fibers heated to fusing temperature, a plunger is forced against them at each of four sides of the cross cavity. All plungers are urged toward a central axis through the cavity under the influence of uniform high pressure applied thereto whereby a substantially uniform pattern of individual fiber deformation is produced throughout the major portion of the thickness of the bundle.

The present invention will be more clearly understood by reference to the following description when taken in conjunction with the accompanying drawing.

DESCRIPTION OF THE DRAWING

FIG. 1 is a diagrammatic illustration, in perspective, of a typical compression mold used in prior art techniques of forming vacuum-tight bundles of optical fibers;

FIGS. 2, 2a and 2b diagrammatically illustrate the general type of individual fiber deformation resulting from the use of prior art compression molds such as that illustrated in FIG. 1;

FIG. 3 is a diagrammatic end view of a compression mold having its cavity filled with optical fibers intended to be compressed according to the principles of this invention; and FIG. 4 is an outline depicting an end of a compressed bundle of fibers wherein the type of fiber deformation resulting from practice of this invention is diagrammatically illustrated by lines extending generally horizontally and vertically across the illustrated end of the fiber bundle.

DESCRIPTION OF THE PREFERRED EMBODIMENT

Referring more particularly to FIGS. 1, 2, 2a and 2b, it will be seen that the usual prior art fiber bundle compression mold comprises a main rectangular channel member 1 within which a bundle of fibers 2 is positioned for compression by plunger 3. Channel member 1, usually having end plates (not shown) is placed within an evacuated furnace, or in an inert gas atmosphere within a furnace, whereupon the bundle of fibers 2 is heated to a softening and fusing temperature for compression by plunger 3.

Microscopic observation of a cross section of a bundle of fibers 2' formed according to the prior art method shown in FIG. 1, reveals that deformation of the fibers is considerably different in various portions of the bundle. In this respect, fibers adjacent a corner of bundle 2', i.e. within and near the circled area $a$, are considerably flattened and generally rhombic in shape as illustrated in FIG. 2a while fibers near the centermost portion of bundle 2', i.e. within and near the circled area $b$ are generally hexagonal as illustrated in FIG. 2b. Such a bundle of fibers, when used in an optical system or the like, exhibits directional variations in individual fiber light-receiving and emitting angles and corresponding variations in amounts of light received and transmitted by the variously shaped fibers which results in degradation of optical images transmitted by the bundle and/or section cut therefrom.

According to the present invention, compressed vacuum-tight bundles of fibers which have a substantially uniform pattern of fiber distortions throughout at least the major central portion of the bundle are formed in a mold 4 having a cross cavity. The cavity, which may be lined with gold foil or mica, not shown, is filled with fibers 6 against which plungers $5_1$-$5_4$ are positioned. With end plates (not shown) covering opposite ends of the mold cavity, the mold is placed in a furnace which is evacuated of air and gases or alternatively supplied with an inert gas atmosphere. In the furnace, the fibers within the mold are heated to fusing temperature and compressed by the application of, for example, from 300 to 2000 pounds per square inch pressure upon each of plungers $5_1$-$5_4$. After holding the temperature and pressure for a period of time sufficient to produce a uniform thermal and pressure gradient throughout the bundle of fibers, the fused fiber bundle is annealed and cooled for removal from the mold. Compressive forces applied by plungers $5_1$-$5_4$ being all equal and directed toward a central axis through the bundle of fibers, produces a substantially uniform pattern of individual fiber deformation substantially as illustrated by lines 6' shown in FIG. 4. Accordingly, with laterally extending portions of the crosslike configuration of the bundle cut away from the central section thereof, this section of the bundle has a substantially uniform pattern of individual fiber distortion wherein each fiber has a regular hexagonal shape and is in vacuum-tight fused relationship with its adjoining fibers. It is pointed out that lines 6' in FIG. 4 are intended to diagrammatically illustrate the general configuration of force patterns produced by compression of the bundle of fibers. The actual regular hexagonal cross-sectional configuration of each fiber in the compressed bundle is not illustrated. However, the expression "regular hexagonal" is intended to be interpreted literally as meaning a hexagonal cross-sectional shape wherein all sides of the hexagon are of substantially equal dimension.

I claim:

1. The method of making a vacuum-tight fused bundle of light-conducting fibers comprising the steps of:

laying within the cavity of a mold, a first multiplicity of long and thin light-conducting fibers in side-by-side parallel relationship with each other in a preselected plurality of superimposed first rows each of a predetermined substantially equal width;

continuing to lay a second multiplicity of similar fibers directly upon said first multiplicity in a preselected plurality of superimposed second rows each of a predetermined substantially equal width considerably greater than that of said first rows, said second rows of fibers being centered over said first rows;

continuing still further to lay a third multiplicity of the fibers directly upon said second multiplicity in a preselected plurality of superimposed third rows each of a predetermined substantially equal width which is approximately equal to the width of said first rows and centered over said first and second rows giving said assembly the transverse overall configuration of a cross having right angularly related opposed pairs of lateral extensions;

heating said assembly to a temperature sufficient for fusing one fiber to another throughout all cross sections thereof;

compressing said assembly with approximately equal pressures applied simultaneously against all of said lateral extensions toward a central axis through the assembly; and holding said assembly of fibers under said pressure and temperature for a period of time sufficient to produce a substantially uniform fusing together of said fibers.

2. The method according to claim 1 wherein said assembly of long and thin light-conducting fibers is made within a cross-cavity of a compression mold, heating of the bundle is accomplished by placing the mold in a furnace and said pressure against said lateral extensions of said bundle of fibers is applied by plungers in said cross-cavity which are forced toward a central axis through the cavity.

3. The method according to claim 1 further including the steps of annealing and cooling the bundle and cutting away remaining thicknesses of said lateral extensions.

* * * * *